(12) United States Patent
Nada

(10) Patent No.: US 8,596,242 B2
(45) Date of Patent: Dec. 3, 2013

(54) FUEL INJECTION CONTROL APPARATUS OF INTERNAL COMBUSTION ENGINE

(75) Inventor: Mitsuhiro Nada, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 580 days.

(21) Appl. No.: 12/991,359

(22) PCT Filed: May 15, 2009

(86) PCT No.: PCT/JP2009/002147
§ 371 (c)(1),
(2), (4) Date: Nov. 5, 2010

(87) PCT Pub. No.: WO2009/139184
PCT Pub. Date: Nov. 19, 2009

(65) Prior Publication Data
US 2011/0060514 A1    Mar. 10, 2011

(30) Foreign Application Priority Data
May 16, 2008    (JP) .................................. 2008-129534

(51) Int. Cl.
*F02B 3/00*    (2006.01)
(52) U.S. Cl.
USPC ............................ 123/299; 123/305; 701/105
(58) Field of Classification Search
USPC .................. 123/299, 300, 305; 701/104, 105
See application file for complete search history.

(56) References Cited

U.S. PATENT DOCUMENTS

| | | | | |
|---|---|---|---|---|
| 6,378,487 | B1 * | 4/2002 | Zukouski et al. | 123/299 |
| 6,688,279 | B2 * | 2/2004 | Ishikawa et al. | 123/299 |
| 6,722,345 | B2 * | 4/2004 | Saeki et al. | 123/435 |
| 6,840,211 | B2 * | 1/2005 | Takahashi | 123/299 |
| 6,901,747 | B2 * | 6/2005 | Tashiro et al. | 60/286 |
| 6,932,048 | B2 * | 8/2005 | Shimazaki | 123/299 |
| 7,065,960 | B2 * | 6/2006 | Gioannini et al. | 60/295 |
| 7,152,573 | B2 * | 12/2006 | Abet et al. | 123/299 |
| 7,284,531 | B2 * | 10/2007 | Brachert et al. | 123/295 |
| 7,296,555 | B2 * | 11/2007 | Tamma et al. | 123/304 |
| 7,305,964 | B2 * | 12/2007 | Scherrieble et al. | 123/299 |
| 7,497,199 | B2 * | 3/2009 | Canale et al. | 123/299 |
| 7,594,390 | B2 * | 9/2009 | Kitahara | 60/285 |
| 7,640,727 | B2 * | 1/2010 | Kitahara | 60/285 |
| 7,788,017 | B2 * | 8/2010 | Nagata et al. | 701/103 |
| 7,806,100 | B2 * | 10/2010 | Schnorbus et al. | 123/299 |

(Continued)

FOREIGN PATENT DOCUMENTS

DE    10 2004 059 004 A1    6/2006
DE    10 2007 013 119 A1    9/2008

(Continued)

*Primary Examiner* — Thomas Moulis
(74) *Attorney, Agent, or Firm* — Kenyon & Kenyon LLP

(57) ABSTRACT

A fuel injection control apparatus of an internal combustion engine of the present invention performs control for a common rail diesel engine so that at a timing when a piston reaches compression top dead center, the rate of heat production due to the combustion of fuel injected in pre-injection is substantially maximal, and furthermore so that the combustion of fuel injected in main injection is started in the vicinity of this timing. As a result, the combustion of fuel injected in main injection is started by fully utilizing the heat production amount due to the pre-injection. Also, this avoids the production of reverse torque, as well as ensures maximizing the amount of torque produced by the combustion of fuel injected in main injection.

3 Claims, 8 Drawing Sheets

(56) References Cited

U.S. PATENT DOCUMENTS

| | | | |
|---|---|---|---|
| 7,861,686 B2 * | 1/2011 | Ogura et al. | 123/299 |
| 7,881,855 B2 * | 2/2011 | Damitz et al. | 701/104 |
| 8,175,789 B2 * | 5/2012 | Kojima et al. | 701/104 |
| 2003/0150420 A1 * | 8/2003 | Ishikawa et al. | 123/300 |
| 2009/0210132 A1 * | 8/2009 | Porten et al. | 701/103 |

FOREIGN PATENT DOCUMENTS

| | | | |
|---|---|---|---|
| EP | 1 132 601 A2 | 9/2001 |
| EP | 1 302 650 A2 | 4/2003 |
| JP | 11-148410 A | 6/1999 |
| JP | 2000-110628 A | 4/2000 |
| JP | 2002-155791 A | 5/2002 |
| JP | 2002-195084 A | 7/2002 |
| JP | 1 302 650 A2 | 4/2003 |
| JP | 2005-240592 A | 9/2005 |
| JP | 2006-266159 A | 10/2006 |
| JP | 2007-278088 A | 10/2007 |

* cited by examiner

US 8,596,242 B2

FUEL INJECTION CONTROL APPARATUS OF INTERNAL COMBUSTION ENGINE

This is a 371 national phase application of PCT/JP2009/002147 filed 15 May 2009, which claims priority to Japanese Patent Application No. 2008-129534 filed 16 May 2008, the contents of which are incorporated herein by reference

TECHNICAL FIELD

The present invention relates to a fuel injection control apparatus of an internal combustion engine typified by a diesel engine. In particular, the present invention relates to, for a compression self-igniting internal combustion engine in which auxiliary injection (also referred to below as pre-injection) can be performed prior to main injection from a fuel injection valve, a technique for optimizing the injection form of the main injection and auxiliary injection.

BACKGROUND ART

As is conventionally known, in a diesel engine used as an automobile engine or the like, fuel injection control is performed that adjusts a period and amount of fuel injection from a fuel injection valve (also referred to below as an injector) according to engine revolution, amount of accelerator operation, coolant temperature, intake air temperature, and the like (e.g., see Patent Citation PLT 1 listed below).

Diesel engine combustion is achieved by premixed combustion and diffusion combustion. When fuel injection from a fuel injection valve begins, first a combustible mixture is produced by the vaporization and diffusion of fuel (ignition delay period). Next, this combustible mixture self-ignites at about the same time at numerous places in a combustion chamber, and combustion rapidly progresses (premixed combustion). Further, fuel continues to be injected into the combustion chamber, so that combustion is continuously performed (diffusion combustion). Thereafter, unburned fuel exists even after fuel injection has ended, so heat continues to be produced for some period of time (afterburning period).

Also, in a diesel engine, as the ignition delay period grows longer, or as the vaporization of fuel in the ignition delay period grows more intense, a flame propagation speed after ignition rises. When this flame propagation speed is high, the amount of fuel that burns at once becomes too great, pressure inside the cylinder drastically increases, thus generating vibration or noise. Such a phenomenon is called diesel knocking, and often occurs particularly when operating with a low load. Also, in this sort of situation, a drastic elevation in combustion temperature is accompanied by an increase in the amount of nitrogen oxide (referred to below as "NOx") produced, and thus exhaust emissions become worse.

In view of this, various fuel injection control apparatuses have been developed in order to prevent this sort of diesel knocking and reduce the amount of NOx that is produced. For example, ordinarily fuel injection from a fuel injection valve is performed intermittently by dividing this injection into a plurality of instances.

For example, in Patent Citation PLT 2 listed below, the injection period of pilot injection, in which fuel is injected prior to main injection, is set to be earlier by an amount equal to a delay period from the pilot injection period to the actual ignition period. As a result, the ignition period of fuel injected in the pilot injection is substantially the same as the main injection period, thereby reducing the amount of PM (Particulate Matter) and HC (Hydrocarbons) that are emitted.

CITATION LIST

Patent Literature

PTL 1: JP 2002-155791A
PTL 2: JP 2002-195084A

SUMMARY OF INVENTION

Technical Problem

In the case of executing pre-injection or pilot injection (typified by pre-injection in the following description) prior to main injection as described above, an ignition delay occurs due to an endothermic reaction when starting such injections, and the length of the ignition delay varies depending on the operating state of the engine and other environmental conditions.

Conventional fuel injection control in diesel engines had not been able to quantify an injection timing for such fuel injection that minimizes the balance of heat produced by the endothermic reaction, nor an interval between fuel injection (injection interval). For this reason, technology for always performing pre-injection and main injection at optimal timings had not been developed.

In other words, various control parameters (such as fuel injection amount and fuel injection timing) had been individually set from the viewpoint of reducing combustion noise, reducing the amount of NOx produced, and ensuring a high engine torque, and in practice, settings have been adapted for each type of engine through trial and error (constructing a suitable fuel injection pattern for pre-injection and main injection for each type of engine).

In this way, in a conventional technique for setting a fuel injection pattern for pre-injection and main injection, there are numerous combinations of injection timings and intervals, and for example, variations in the evaluation of workers who perform such adapting lead to deviation from the optimal fuel injection pattern, which is directly reflected as variations in fuel injection patterns. For this reason, it had been nearly impossible to obtain an optimal fuel injection pattern (optimal solution).

In other words, since fuel injection patterns have conventionally been determined through trial and error, a systematic fuel injection control technique common to various types of engines has not been developed, and therefore there is still some room for improvement in order to achieve optimization of fuel injection control.

The present invention has been achieved in view of the above, and an object thereof is to provide, for a compression self-igniting internal combustion engine in which auxiliary injection can be performed prior to main injection, a systematized fuel injection control technique that can optimize the injection form of the main injection and auxiliary injection.

Solution to Problem

—Principle of Solution to the Problems—

A principle of the solution provided by the present invention for achieving the above aim is appropriately setting the injection timing of auxiliary injection and main injection so that at a timing at which a piston reaches compression top dead center, the rate of heat production due to the combustion of fuel injected in the auxiliary injection is substantially maximal, and furthermore the combustion of fuel injected in the main injection starts in the vicinity of the same timing. In other words, consideration is given to ignition delay due to heat absorption in the auxiliary injection, and the heat production rate is caused to peak in the auxiliary injection when the piston is at compression top dead center, so that the amount of heat produced in preheating is maximized and combustion efficiency is maximized. Also, in order to avoid reverse torque (torque that is produced before the piston reaches compression top dead center) that is produced due to the combustion of fuel injected in the main injection, the start timing of the combustion of fuel injected in this main injection is set to be in a vicinity of when the piston reaches compression top dead center.

—Solution Means—

Specifically, the present invention is premised on a fuel injection control apparatus of a compression self-igniting internal combustion engine in which at least a main injection and an auxiliary injection performed prior to the main injection can be performed as an operation of fuel injection from a fuel injection valve. In this fuel injection control apparatus of an internal combustion engine, a fuel injection control means is for executing a high-efficiency fuel injection control operation for controlling an injection timing and an injection amount of the main injection and the auxiliary injection so that a timing at which a rate of heat production due to combustion of fuel injected in the auxiliary injection is maximal, a start timing of combustion of fuel injected in the main injection, and a timing at which a piston moving back and forth in a cylinder reaches compression top dead center are substantially the same.

By setting the injection form of the auxiliary injection and main injection according to these timings, when the combustion of fuel injected in the main injection starts, the rate of heat production due to the combustion of fuel injected in the auxiliary injection is maximized, and the combustion of fuel injected in the main injection can be started by fully utilizing the amount of heat produced in the auxiliary injection. This suppresses a reduction in temperature due to an endothermic reaction at the start of the main injection, and suppresses the ignition delay of fuel injected in the main injection. For this reason, it is possible to progress from combustion in the main injection to stable diffusion combustion without an ignition delay, while suppressing the amount of fuel injected in the auxiliary injection to a requisite minimum, thereby enabling improving the fuel consumption rate. Also, reverse torque (torque that acts in a direction opposite to the crankshaft rotation direction) is not produced since the start timing of the combustion of fuel injected in the main injection is substantially the same as when the piston reaches compression top dead center, and furthermore, combustion for producing torque is started when the combustion chamber is at a substantially minimal size, thereby enabling ensuring a maximum amount of torque produced by the combustion.

The following are more specific forms of the fuel injection control means. The fuel injection control means is furthermore for executing an exhaust-emission-priority fuel injection control operation for setting the start timing of combustion of fuel injected in the main injection so as to be later than the timing at which the rate of heat production due to combustion of fuel injected in the auxiliary injection is maximal. Also, the fuel injection control means switches the high-efficiency fuel injection control operation and the exhaust-emission-priority fuel injection control operation according to an operating state of the internal combustion engine.

As a specific exhaust-emission-priority fuel injection control operation in this case, a configuration is adapted in which it is possible to switch, according to the operating state of the internal combustion engine, a case of setting the timing at which the rate of heat production due to combustion of fuel injected in the auxiliary injection is maximal so as to be substantially the same as the timing at which the piston reaches compression top dead center, and a case of setting the timing at which the rate of heat production due to combustion of fuel injected in the auxiliary injection is maximal so as to be later than the timing at which the piston reaches compression top dead center.

According to the above configuration, for example, in an operating range of an internal combustion engine in which exhaust emission is not exacerbated, the fuel injection controlling means performs the high-efficiency fuel injection control operation (a control operation for causing the timing at which the rate of heat production due to the combustion of fuel injected in the auxiliary injection is maximal, the start timing of the combustion of fuel injected in main injection, and the timing at which the piston moving back and forth in the cylinder reaches compression top dead center to be substantially the same). On the other hand, in an operating range of an internal combustion engine in which there is concern regarding the exacerbation of exhaust emission, or in a situation in which exhaust emission has actually exacerbated, the fuel injection controlling means performs the exhaust-emission-priority fuel injection control operation (a control operation for setting the start timing of the combustion of fuel injected in the main injection so as to be later than the timing at which the rate of heat production due to the combustion of fuel injected in the auxiliary injection is maximal). In this way, the high-efficiency fuel injection control operation and the exhaust-emission-priority fuel injection control operation are switched according to the operating state of the internal combustion engine, thereby both preventing the exacerbation of exhaust emission and realizing a high combustion efficiency. Also, if there is a desire to obtain a sufficient preheating effect by the auxiliary injection (e.g., when the internal combustion engine is cold) when the exhaust-emission-priority fuel injection control operation is being performed, the timing at which the rate of heat production due to the combustion of fuel injected in the auxiliary injection is maximal is set so as to be substantially the same as the timing at which the piston reaches compression top dead center. Furthermore, if there is a desire to reliably avoid the production of the reverse torque described above, the timing at which the rate of heat production due to the combustion of fuel injected in the auxiliary injection is maximal is set to be later than the timing at which the piston reaches compression top dead center.

Advantageous Effects of Invention

In the present invention, regarding setting a fuel injection pressure in a compression self-igniting internal combustion engine, the timing at which the rate of heat production due to the combustion of fuel injected in auxiliary injection is maximal, the start timing of the combustion of fuel injected in main injection, and the timing at which a piston moving back and forth in a cylinder reaches compression top dead center are set to be substantially the same. This enables starting the combustion of fuel injected in the main injection by fully utilizing the amount of heat produced by the auxiliary injection, and furthermore enables ensuring a maximum amount of torque production in an internal combustion engine, without the production of reverse torque due to the combustion of fuel injected in the main injection.

DESCRIPTION OF EMBODIMENTS

Following is a description of an embodiment of the present invention based on the drawings. In the present embodiment, a case is described in which the present invention is applied to a common rail in-cylinder direct injection multi-cylinder (for example, inline four-cylinder) diesel engine (compression self-igniting internal combustion engine) mounted in an automobile.

—Engine Configuration—

Figure 1:
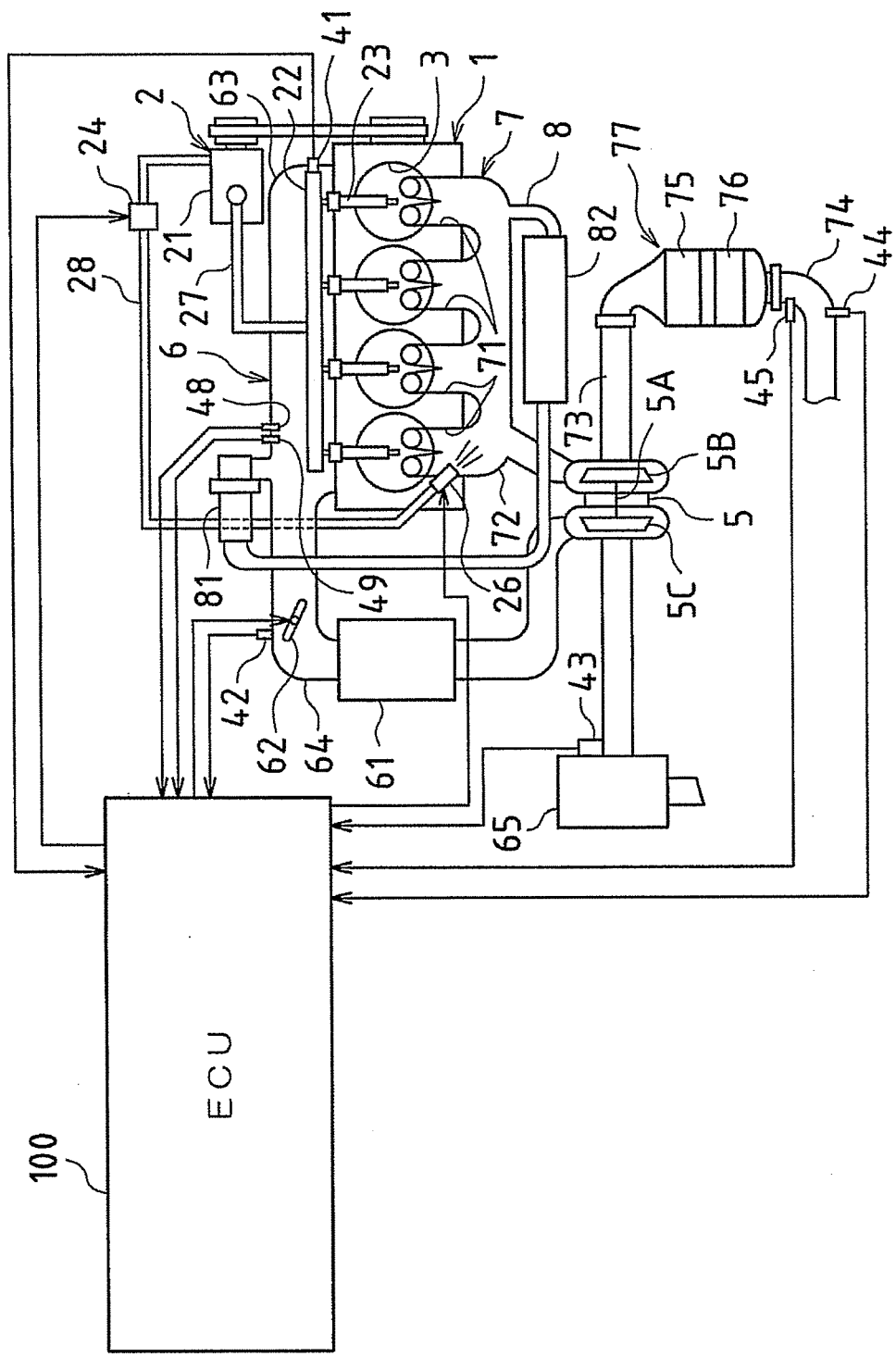
FIG. 1 is a schematic configuration diagram of a diesel engine and a control system for the same according to an embodiment of the present invention.
Figure 2:
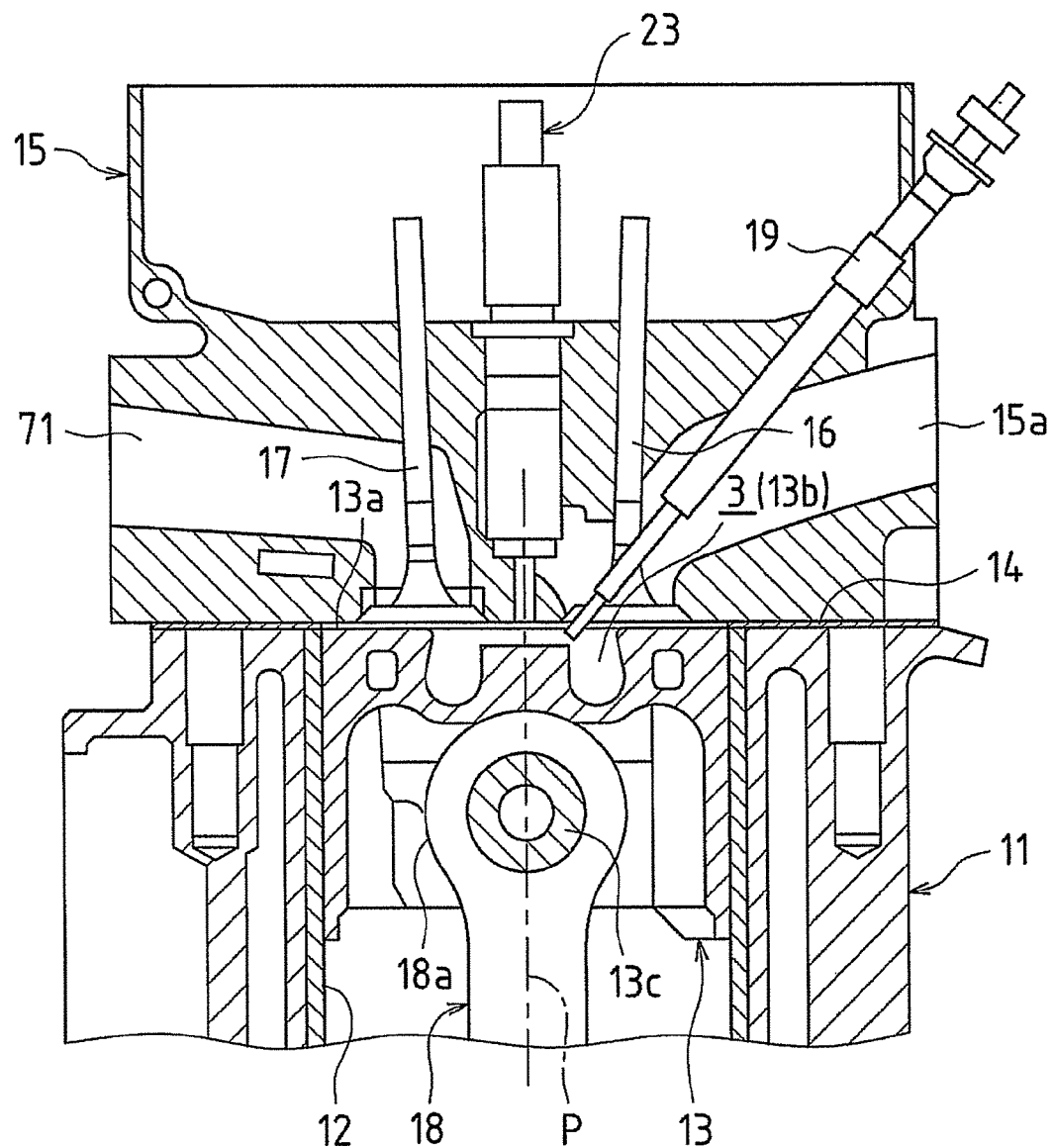
FIG. 2 is a cross-sectional diagram showing a combustion chamber of the diesel engine and parts in a vicinity of the combustion chamber according to the embodiment of the present invention.

First, the overall configuration of a diesel engine (referred to below as simply an engine) according to the present embodiment will be described. FIG. 1 is a schematic configuration diagram of an engine 1 and a control system for the same according to the present embodiment. FIG. 2 is a cross-sectional view that shows a combustion chamber 3 of the diesel engine and parts in the vicinity of the combustion chamber 3.

As shown in FIG. 1, the engine 1 according to the present embodiment is configured as a diesel engine system whose main portions are a fuel supply system 2, combustion chambers 3, an intake system 6, an exhaust system 7, and the like.

The fuel supply system 2 is provided with a supply pump 21, a common rail 22, injectors (fuel injection valves) 23, a cutoff valve 24, a fuel addition valve 26, an engine fuel path 27, an added fuel path 28, and the like.

The supply pump 21 draws fuel from a fuel tank, and after putting the drawn fuel under high pressure, supplies that fuel to the common rail 22 via the engine fuel path 27. The common rail 22 has a function as an accumulation chamber where high pressure fuel supplied from the supply pump 21 is held (accumulated) at a predetermined pressure, and this accumulated fuel is distributed to each injector 23. The injectors 23 are configured from piezo injectors within which a piezoelectric element (piezo element) is provided, and supply fuel by injection into the combustion chambers 3 by appropriately opening a valve. The details of control of fuel injection from the injectors 23 will be described later.

Also, the supply pump 21 supplies part of the fuel drawn from the fuel tank to the fuel addition valve 26 via the added fuel path 28. In the added fuel path 28, the aforementioned cutoff valve 24 is provided in order to stop fuel addition by cutting off the added fuel path 28 during an emergency.

The fuel addition valve 26 is configured from an electronically controlled opening/closing valve whose valve opening period is controlled with an addition control operation by an ECU 100 described later such that the amount of fuel added to the exhaust system 7 becomes a target addition amount (an addition amount such that exhaust A/F becomes target A/F), or such that a fuel addition timing becomes a predetermined timing. That is, a desired amount of fuel from the fuel addition valve 26 is supplied by injection to the exhaust system 7 (to an exhaust manifold 72 from exhaust ports 71) at an appropriate timing.

The intake system 6 is provided with an intake manifold 63 connected to an intake port 15a formed in a cylinder head 15 (see FIG. 2), and an intake tube 64 that constitutes an intake path is connected to the intake manifold 63. Also, in this intake path, an air cleaner 65, an airflow meter 43, and a throttle valve 62 are disposed in order from the upstream side. The airflow meter 43 outputs an electrical signal according to the amount of air that flows into the intake path via the air cleaner 65.

The exhaust system 7 is provided with the exhaust manifold 72 connected to the exhaust ports 71 formed in the cylinder head 15, and exhaust tubes 73 and 74 that constitute an exhaust path are connected to the exhaust manifold 72. Also, in this exhaust path, a maniverter (exhaust purification apparatus) 77 is disposed that is provided with a NOx storage catalyst (NSR catalyst: NOx Storage Reduction catalyst) 75 and a DPNR catalyst (Diesel Particulate-NOx Reduction catalyst) 76, which are described later. Following is a description of the NSR catalyst 75 and the DPNR catalyst 76.

The NSR catalyst 75 is a storage reduction NOx catalyst, and is configured using, for example, alumina ($Al_2O_3$) as a support, with, for example, an alkali metal such as potassium (K), sodium (Na), lithium (Li), or cesium (Cs), an alkaline earth element such as barium (Ba) or calcium (Ca), a rare earth element such as lanthanum (La) or Yttrium (Y), and a precious metal such as platinum (Pt) supported on this support.

The NSR catalyst 75, in a state in which a large amount of oxygen is present in the exhaust, stores NOx, and in a state in which the oxygen concentration in the exhaust is low and a large amount of a reduction component (for example, an unburned component (HC) of fuel) is present, reduces NOx to $NO_2$ or NO and releases the resulting $NO_2$ or NO. NOx that has been released as $NO_2$ or NO is further reduced due to quickly reacting with HC or CO in the exhaust and becomes $N_2$. Also, by reducing $NO_2$ or NO, HC and CO themselves are oxidized and thus become $H_2O$ and $CO_2$. In other words, by appropriately adjusting the oxygen concentration or the HC component in the exhaust introduced to the NSR catalyst 75, it is possible to purify HC, CO, and NOx in the exhaust. In the configuration of the present embodiment, adjustment of the oxygen concentration or the HC component in the exhaust can be performed with an operation to add fuel from the aforementioned fuel addition valve 26.

On the other hand, in the DPNR catalyst 76, a NOx storage reduction catalyst is supported on a porous ceramic structure, for example, and PM in exhaust gas is captured when passing through a porous wall. When the air-fuel ratio of the exhaust gas is lean, NOx in the exhaust gas is stored in the NOx storage reduction catalyst, and when the air-fuel ratio is rich, the stored NOx is reduced and released. Furthermore, a catalyst that oxidizes/burns the captured PM (for example, an oxidization catalyst whose main component is a precious metal such as platinum) is supported on the DPNR catalyst 76.

Here, the configuration of the combustion chamber 3 of the diesel engine and parts in the vicinity of the combustion chamber 3 will be described. The following description makes reference to FIG. 2. As shown in FIG. 2, in a cylinder block 11 that constitutes part of the main body of the engine, a cylindrical cylinder bore 12 is formed in each cylinder (each of four cylinders), and a piston 13 is housed within each cylinder bore 12 such that the piston 13 can slide in the vertical direction.

The aforementioned combustion chamber 3 is formed on the top side of a top face 13*a* of the piston 13. More specifically, the combustion chamber 3 is partitioned by a lower face of the cylinder head 15 installed on top of the cylinder block 11 via a gasket 14, an inner wall face of the cylinder bore 12, and the top face 13*a* of the piston 13. A cavity 13*b* is concavely provided in approximately the center of the top face 13*a* of the piston 13, and this cavity 13*b* also constitutes part of the combustion chamber 3.

A small end 18*a* of a connecting rod 18 is linked to the piston 13 by a piston pin 13*c*, and a large end of the connecting rod 18 is linked to a crankshaft that is an engine output shaft. Thus, back and forth movement of the piston 13 within the cylinder bore 12 is transmitted to the crankshaft via the connecting rod 18, and engine output is obtained due to rotation of this crankshaft. Also, a glow plug 19 is disposed facing the combustion chamber 3. The glow plug 19 glows due to the flow of electrical current immediately before the engine 1 is started, and functions as a starting assistance apparatus whereby ignition and combustion are promoted due to part of a fuel spray being blown onto the glow plug.

In the cylinder head 15, the intake port 15*a* that introduces air to the combustion chamber 3 and the exhaust port 71 that discharges exhaust gas from the combustion chamber 3 are respectively formed, and an intake valve 16 that opens/closes the intake port 15*a* and an exhaust valve 17 that opens/closes the exhaust port 71 are disposed. The intake valve 16 and the exhaust valve 17 are disposed facing each other on either side of a cylinder center line P. That is, the engine 1 is configured as a cross flow-type engine. Also, the injector 23 that injects fuel directly into the combustion chamber 3 is installed in the cylinder head 15. The injector 23 is disposed in approximately the center above the combustion chamber 3, in an erect orientation along the cylinder center line P, and injects fuel introduced from the common rail 22 toward the combustion chamber 3 at a predetermined timing.

Furthermore, as shown in FIG. 1, a turbocharger 5 is provided in the engine 1. This turbocharger 5 is provided with a turbine wheel 5B and a compressor wheel 5C that are linked via a turbine shaft 5A. The compressor wheel 5C is disposed facing the inside of the intake tube 64, and the turbine wheel 5B is disposed facing the inside of the exhaust tube 73. Thus the turbocharger 5 uses exhaust flow (exhaust pressure) received by the turbine wheel 5B to rotate the compressor wheel 5C, thereby performing a so-called turbocharging operation that increases the intake pressure. In the present embodiment, the turbocharger 5 is a variable nozzle-type turbocharger, in which a variable nozzle vane mechanism (not shown) is provided on the turbine wheel 5B side, and by adjusting the opening degree of this variable nozzle vane mechanism it is possible to adjust the turbocharging pressure of the engine 1.

An intercooler 61 for forcibly cooling intake air heated due to supercharging with the turbocharger 5 is provided in the intake tube 64 of the intake system 6. The throttle valve 62 provided on the downstream side from the intercooler 61 is an electronically controlled opening/closing valve whose opening degree is capable of stepless adjustment, and has a function to constrict the area of the path of intake air under predetermined conditions, and thus adjust (reduce) the supplied amount of intake air.

Also, the engine 1 is provided with an exhaust gas recirculation path (EGR path) 8 that connects the intake system 6 and the exhaust system 7. The EGR path 8 decreases the combustion temperature by appropriately recirculating part of the exhaust to the intake system 6 and resupplying that exhaust to the combustion chamber 3, thus reducing the amount of NOx produced. Also, provided in the EGR path 8 are an EGR valve 81 that by being opened/closed steplessly under electronic control is capable of freely adjusting the amount of exhaust flow that flows through the EGR path 8, and an EGR cooler 82 for cooling exhaust that passes through (recirculates through) the EGR path 8.

—Sensors—

Various sensors are installed in respective sites in the engine 1, and these sensors output signals related to environmental conditions at the respective sites and the operating state of the engine 1.

For example, the above airflow meter 43 outputs a detection signal according to an intake air flow amount (intake air amount) on the upstream side of the throttle valve 62 within the intake system 6. An intake temperature sensor 49 is disposed in the intake manifold 63, and outputs a detection signal according to the temperature of intake air. An intake pressure sensor 48 is disposed in the intake manifold 63, and outputs a detection signal according to the intake air pressure. An A/F (air-fuel ratio) sensor 44 outputs a detection signal that continuously changes according to the oxygen concentration in exhaust on the downstream side of the maniverter 77 of the exhaust system 7. An exhaust temperature sensor 45 likewise outputs a detection signal according to the temperature of exhaust gas (exhaust temperature) on the downstream side of the maniverter 77 of the exhaust system 7. A rail pressure sensor 41 outputs a detection signal according to the pressure of fuel accumulated in the common rail 22. A throttle opening degree sensor 42 detects the opening degree of the throttle valve 62.

—ECU—

Figure 3:
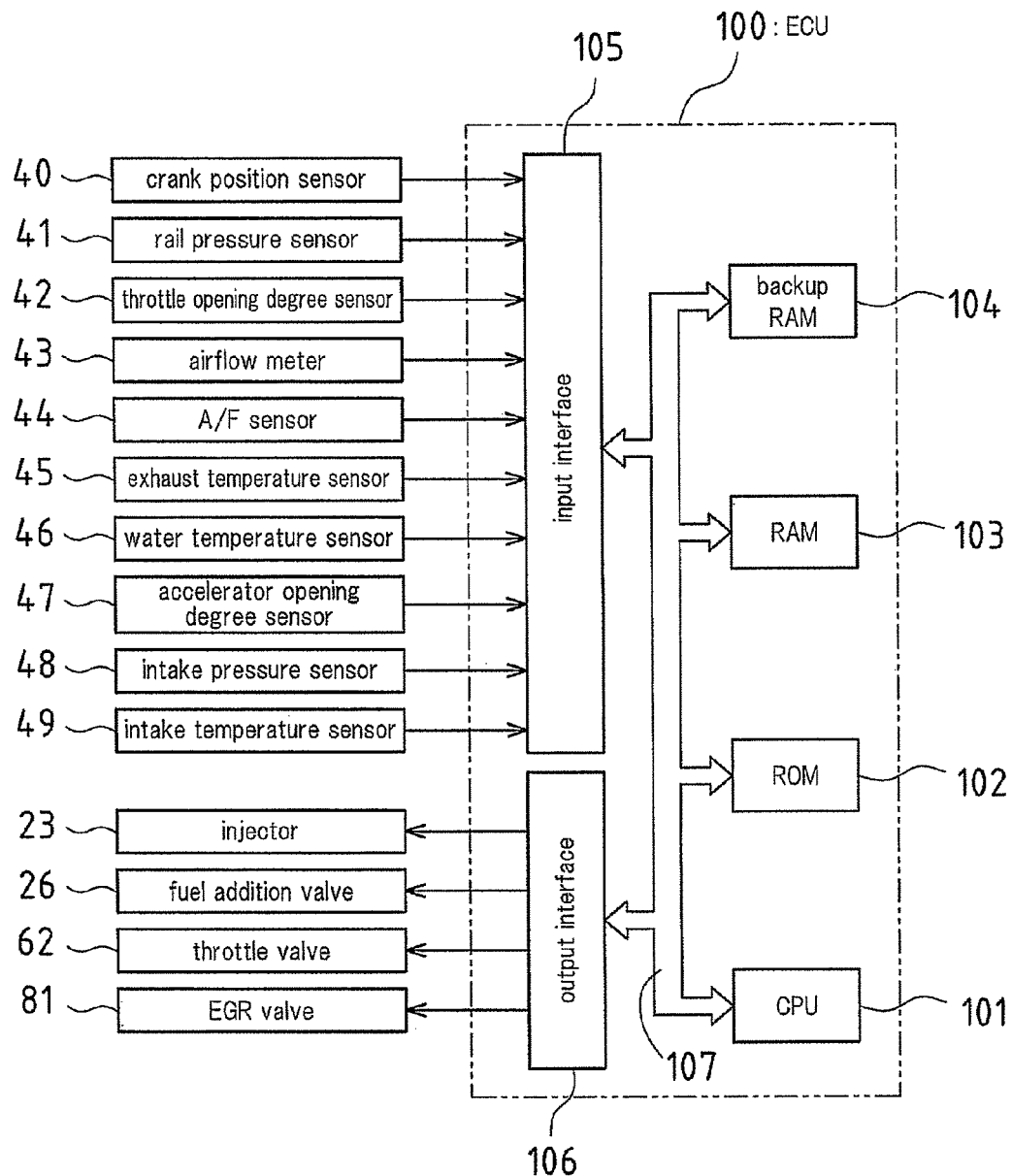
FIG. 3 is a block diagram showing a configuration of a control system such as an ECU according to the embodiment of the present invention.

As shown in FIG. 3, the ECU 100 is provided with a CPU 101, a ROM 102, a RAM 103, a backup RAM 104, and the like. In the ROM 102, various control programs, maps that are referred to when executing those various control programs, and the like are stored. The CPU 101 executes various computational processes based on the various control programs and maps stored in the ROM 102. The RAM 103 is a memory that temporarily stores data resulting from computation with the CPU 101 or data that has been input from the respective sensors, and the backup RAM 104, for example, is a nonvolatile memory that stores that data or the like to be saved when the engine 1 is stopped.

The CPU 101, the ROM 102, the RAM 103, and the backup RAM 104 are connected to each other via a bus 107, and are connected to an input interface 105 and an output interface 106 via the bus 107.

The rail pressure sensor 41, the throttle opening degree sensor 42, the airflow meter 43, the A/F sensor 44, the exhaust temperature sensor 45, the intake pressure sensor 48, and the intake temperature sensor 49 are connected to the input interface 105. Further, a water temperature sensor 46 that outputs a detection signal according to the coolant temperature of the engine 1, an accelerator opening degree sensor 47 that outputs a detection signal according to the amount that an accelerator pedal is depressed, a crank position sensor 40 that outputs a detection signal (pulse) each time that an output shaft (crankshaft) of the engine 1 rotates a fixed angle, and the like are connected to the input interface 105. On the other hand, the aforementioned injectors 23, fuel addition valve 26, throttle valve 62, EGR valve 81, and the like are connected to the output interface 106.

The ECU 100 executes various control of the engine 1 based on the output of the various sensors described above. Furthermore, the ECU 100 executes pilot injection, pre-injection, main injection, after-injection, and post injection, described below, as control of fuel injection of the injectors 23.

The fuel injection pressure when executing these fuel injections is determined by the internal pressure of the common rail 22. As the common rail internal pressure, ordinarily, the target value of the fuel pressure supplied from the common rail 22 to the injectors 23 (i.e., the target rail pressure) is set to increase as the engine load increases, and as the engine revolution increases. That is, when the engine load is high, a large amount of air is drawn into the combustion chamber 3, so it is necessary to inject a large amount of fuel into the combustion chamber 3 from the injectors 23, and therefore it is necessary to set a high injection pressure from the injectors 23. Also, when the engine revolution is high, the period during which injection is possible is short, so it is necessary to inject a large amount of fuel per unit time, and therefore it is necessary to set a high injection pressure from the injectors 23. In this way, the target rail pressure is ordinarily set based on the engine load and the engine revolution.

The optimum values of fuel injection parameters for fuel injection such as the above pilot injection, main injection, and the like differ according to temperature conditions of the engine, intake air, and the like.

For example, the ECU 100 adjusts the amount of fuel discharged by the supply pump 21 such that the common rail pressure becomes the same as the target rail pressure set based on the engine operating state, i.e., such that the fuel injection pressure matches the target injection pressure. Also, the ECU 100 determines the fuel injection amount and the form of fuel injection based on the engine operating state. Specifically, the ECU 100 calculates an engine revolution speed based on the value detected by the crank position sensor 40 and obtains an amount of accelerator pedal depression (accelerator opening degree) based on the value detected by the accelerator opening degree sensor 47, and determines the total fuel injection amount (the sum of the injection amount in pre-injection and the injection amount in main injection, described below) based on the engine revolution speed and the accelerator opening degree.

—Form of Fuel Injection—

Following is a general description of the operation of the pilot injection, pre-injection, main injection, after-injection, and post-injection in the present embodiment.

(Pilot Injection)

Pilot injection is an injection operation that pre-injects a small amount of fuel prior to main injection from the injectors 23. More specifically, after execution of this pilot injection, fuel injection is temporarily interrupted, the temperature of compressed gas (temperature in the cylinder) is adequately increased to reach the fuel self-ignition temperature before main injection is started, and thus ignition of fuel injected in the main injection is favorably ensured. That is, the function of the pilot injection in the present embodiment is specialized for preheating the inside of the cylinder. In other words, the pilot injection in the present embodiment is an injection operation for pre-heating gas within the combustion chamber 3 (pre-heating fuel supply operation).

Specifically, in the present embodiment, in order to achieve an appropriate spray distribution and local concentration, an injection ratio is set to a minimum injection ratio (for example, an injection amount of 1.5 mm$^3$ per instance), and by executing pilot injection a plurality of times, a total pilot injection amount necessary in this pilot injection is ensured. More specifically, the number of instances of pilot injection is determined by the following expression (1).

$$N = \{(Ca \text{"multiply"} \text{"delta"} T) \text{"multiply"} Kc \text{"multiply"} Kv\} / (J \text{"multiply"} \text{"eta"}) \quad \text{Expression (1)}$$

(N: injection instances of pilot injection, Ca: heat capacity of air introduced into cylinder, "delta"T: remaining temperature required to reach self-ignition temperature, Kc: heat capacity correction coefficient from EGR ratio, Kv: space subject to combustion contribution, J: theoretical amount of heat produced in 1.5 mm$^3$, "eta": fuel efficiency)

Here, the temperature "delta" T of the portion that has not reached self-ignition temperature is the difference between the fuel self-ignition temperature and the compressed gas temperature in the target ignition period (for example, the period in which the piston 13 has reached compression top dead center) of fuel during main injection, and corresponds to the amount of heat necessary to cause the compressed gas temperature in the target ignition period to reach the fuel self-ignition temperature. Note that in above expression (1), the pilot injection amount per instance is set to a fixed value (for example, 1.5 mm$^3$), and by setting the number of instances of injection, the necessary total pilot injection amount is ensured. This fixed value of the pilot injection amount per instance is not limited to the value stated above.

The interval of pilot injection in which injection is divided in this manner is determined according to the response (speed of opening/closing operation) of the injectors 23. In the present embodiment, the interval is set to 200 micro-seconds, for example. This pilot injection interval is not limited to the above value. Note that the angle mentioned below means a value converted to a crankshaft rotation angle.

Furthermore, the injection start timing for this pilot injection is set according to expression (2) below, for example at a crank angle of 80 degrees or thereafter before compression top dead center (BTDC) of the piston 13.

Pilot injection start angle=pilot combustion end angle+pilot injection period working angle+(crank angle conversion value of combustion required time in one instance of pilot injection times N+crank angle conversion value of ignition delay time−crank angle conversion value of overlap time)     Expression (2)

Here, the pilot combustion end angle is an angle set in order to complete combustion by pilot injection before starting pre-injection. The ignition delay time is a delay time from the time when pilot injection is executed to the time when the fuel injected in the pilot injection ignites. The overlap time is an overlap time of the combustion period of fuel from a previously executed instance of pilot injection and the combustion period of fuel from the subsequently executed instance of pilot injection (time during which two combustions are simultaneously being performed), and an overlap time of the combustion period of fuel from a final instance of pilot injection and the combustion period of fuel from the subsequently executed instance of pre-injection.

(Pre-Injection)

Pre-injection is an injection operation for suppressing the initial combustion speed from main injection, thus leading to stable diffusion combustion (torque-producing fuel supply operation), and is also called auxiliary injection. Also, the pre-injection of the present embodiment not only has the function of suppressing the initial combustion speed from main injection described above, but also has a function of performing preheating to raise the temperature inside the cylinder.

Specifically, in the present embodiment, for example, a pre-injection amount is set to 10% of the total injection amount (the sum of the injection amount in pre-injection and the injection amount in main injection) for obtaining the required torque determined according to the operating state, such as the engine revolution, amount of accelerator operation, coolant temperature, and intake air temperature. This ratio of the pre-injection amount to the total injection amount is set according to, for example, the amount of heat required when preheating the interior of the cylinder.

In this case, if the total injection amount is less than 15 mm$^3$, the injection amount in the pre-injection is less than the minimum limit injection amount for the injectors 23 (1.5 mm$^3$), so pre-injection is not executed. Note that in this case, merely the minimum limit injection amount (1.5 mm$^3$) of fuel for the injectors 23 may be injected in the pre-injection. On the other hand, when the total injection amount of pre-injection is required to be greater than or equal to two times the minimum limit injection amount of the injectors 23 (e.g., 3 mm$^3$ or more), the total injection amount necessary in this pre-injection is ensured by executing pre-injection a plurality of times. As a result, the ignition delay in pre-injection is suppressed, and the initial combustion speed from main injection is reliably suppressed, thus enabling leading to stable diffusion combustion.

Also, the injection start angle for this pre-injection is set according to expression (3) below.

Pre-injection start angle=pre-combustion end angle+ pre-injection period working angle+(crank angle conversion value of combustion required time in pre-injection+crank angle conversion value of ignition delay time−crank angle conversion value of overlap time)     Expression (3)

Here, the ignition delay time is a delay time from the time when pre-injection is executed to the time when that fuel ignites. The overlap time is, when pre-injection is performed a plurality of times, an overlap time of the combustion period of fuel from previously executed pre-injection and combustion period of fuel from subsequently executed pre-injection (time during which two combustions are simultaneously being performed), and an overlap time of the combustion period of fuel from final pre-injection and the combustion period of fuel from subsequently executed main injection, and also an overlap time of the combustion period of fuel from final pilot injection and the combustion period of fuel from pre-injection.

The present invention is not limited to the above expression (3), but rather the injection start angle for pre-injection may be set according to the crank angle conversion value (ignition delay angle) of ignition delay time in pre-injection and a crank angle conversion value (combustion start angle) of a time, after elapse of the ignition delay time, from when the balance of the amount of heat produced in the cylinder due to the endothermic reaction at the pre-injection start time is negative until when the balance of this produced heat amount becomes positive.

(Main Injection)

Main injection is an injection operation for producing torque of the engine 1 (torque-producing fuel supply operation). Specifically, in the present embodiment, an injection amount is set that is obtained by subtracting the injection amount in the above pre-injection from the above total combustion injection amount for obtaining the required torque determined according to the operating state, such as the engine revolution, amount of accelerator operation, coolant temperature, and intake air temperature.

Also, the injection start angle (crank angle position) for this main injection is set according to expression (4) below.

Main injection start angle=main ignition period+main injection period working angle+(crank angle conversion value of combustion required time in main injection+crank angle conversion value of ignition delay time−crank angle conversion value of overlap time)     Expression (4)

Here, the ignition delay time is a delay time from the time when main injection is executed to the time when that fuel ignites. The overlap time is an overlap time of the combustion period of fuel from the above pre-injection and the combustion period of fuel from main injection, and an overlap time of the combustion period of fuel from main injection and the combustion period of fuel from after-injection.

The present invention is not limited to the above expression (4), but rather the injection start angle for main injection may be set according to the crank angle conversion value (ignition delay angle) of the ignition delay time in main injection.

Note that a specific injection form for the pre-injection and main injection described above, and particularly the details of the relationship with the crank angle position, is described later.

The following is a brief description of a control process for pre-injection and main injection described above. First, regarding a torque requirement value of the engine 1, a sum of the injection amount in the pre-injection and the injection amount in the main injection is obtained as the total fuel injection amount. In other words, the total fuel injection amount is calculated as the amount required to produce the torque that is required for the engine 1.

The torque requirement value of the engine 1 is determined according to the operating state, such as the engine revolution, amount of accelerator operation, coolant temperature, and intake air temperature, and according to usage conditions of accessories and the like. For example, a higher engine torque requirement value is obtained as the engine revolution (engine revolution calculated based on the value detected by the crank position sensor 40) increases, or as the accelerator operation amount (amount of accelerator pedal depression detected by the accelerator opening degree sensor 47) increases (as the accelerator opening degree increases).

After a total fuel injection amount has been calculated in this way, a ratio (division ratio) of the injection amount in pre-injection relative to this total fuel injection amount is set. In other words, the pre-injection amount is set as an amount obtained by dividing the total fuel injection amount using the above division ratio. This division ratio (pre-injection amount) is obtained as a value that achieves both "suppression of fuel ignition delay in main injection" and "suppression of peak value in rate of heat production due to combustion in main injection". With these two types of suppression, it is possible to achieve a reduction in combustion noise and the amount of NOx produced due to the realization of slow combustion, while also ensuring high engine torque. In the present embodiment, the division ratio is set to 10%.

(After-Injection)

After-injection is an injection operation for increasing the exhaust gas temperature. Specifically, in the present embodiment, the combustion energy of fuel supplied by after-injection is not converted to engine torque, but rather, after-injection is executed at a timing such that the majority of that combustion energy is obtained as exhaust heat energy. Also, in this after-injection as well, in the same way as the case of the pilot injection described above, the minimum injection ratio is set (for example, an injection amount of 1.5 mm³ per instance), and the total after-injection amount necessary in this after-injection is ensured by executing after-injection a plurality of times.

(Post-Injection)

Post-injection is an injection operation for achieving increased temperature of the above maniverter 77 by directly introducing fuel to the exhaust system 7. For example, when the deposited amount of PM captured by the DPNR catalyst 76 has exceeded a predetermined amount (for example, known from detection of a before/after pressure difference of the maniverter 77), post injection is executed.

—Technique for Setting Target Fuel Pressure—

The following describes a technical idea in the case of setting a target fuel pressure in the present embodiment.

In the diesel engine 1, it is important to simultaneously meet the demands for an improvement in exhaust emission by cutting back the amount of NOx produced, a reduction in combustion noise during the combustion stroke, and ensuring sufficient engine torque. As a means for simultaneously meeting these demands, the inventors of the present invention focused on the fact that appropriately controlling the changing state of the heat production rate (changing state expressed as a heat production rate waveform) in the cylinder during the combustion stroke is effective, and achieved the technique for setting a target fuel pressure described below, which is a technique for controlling the changing state of the heat production rate.

Figure 4:
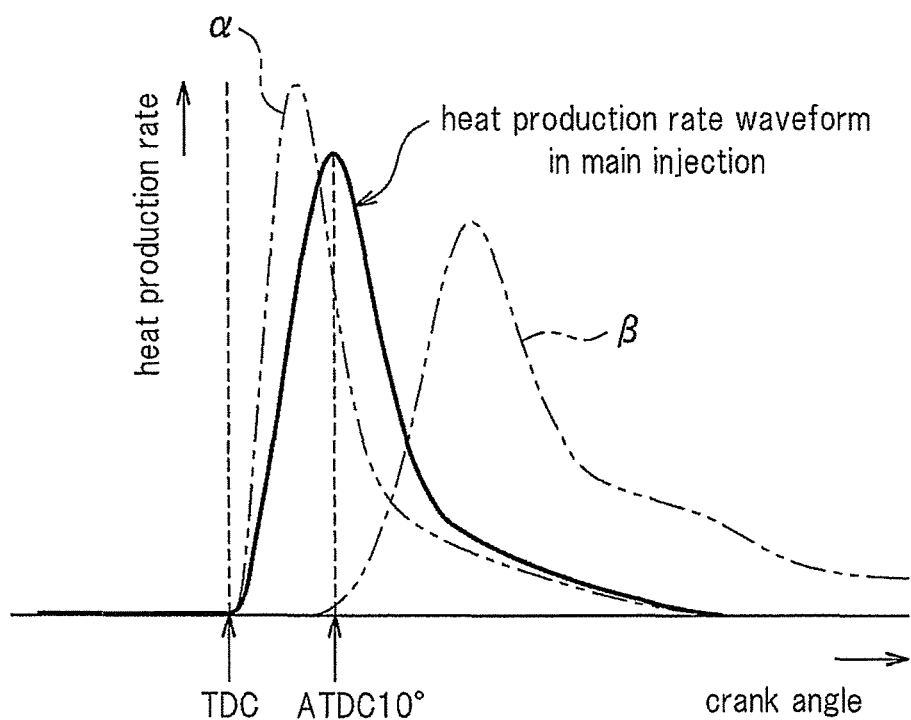
FIG. 4 is a waveform diagram showing changes in a heat production rate during an expansion stroke according to the embodiment of the present invention.

In FIG. 4, the horizontal axis represents the crank angle, the vertical axis represents the heat production rate, and the solid line indicates an ideal heat production rate waveform regarding the combustion of fuel injected in main injection. FIG. 4 shows heat production rate waveforms for exclusively main injection (heat production rate waveforms to which heat production rates from pre-injection have not been added). In this figure, "TDC" indicates a crank angle position corresponding to compression top dead center of the piston 13.

In this heat production rate waveform, for example, the combustion of fuel injected in main injection is started when the piston 13 is at compression top dead center (TDC), the heat production rate reaches a maximum value (peak value) at a predetermined piston position after compression top dead center (e.g., a point 10 degrees after compression top dead center (10 degrees ATDC)), and furthermore, combustion of the fuel injected in the main injection ends at another predetermined piston position after compression top dead center (e.g., a point 25 degrees after compression top dead center (25 degrees ATDC)). In order for combustion to end no later than this point, in the present embodiment, the injection of fuel in the main injection is ended no later than 22 degrees after compression top dead center (22 degrees ATDC). By causing combustion of the air-fuel mixture to be performed in this kind of heat production rate changing state, for example, combustion of 50% of the air-fuel mixture in the cylinder is complete at 10 degrees after compression top dead center (10 degrees ATDC). In other words, approximately 50% of the total amount of heat produced in the expansion stroke is produced no later than 10 degrees ATDC, and the engine 1 can be operated with high thermal efficiency.

Also, the waveform indicated by a dashed double-dotted line "alpha" in FIG. 4 is a heat production rate waveform in the case where the fuel injection pressure has been set higher than the appropriate value, and as shown by this waveform, the combustion speed and peak value are both too high, and there is concern regarding an increase in combustion noise and the NOx production amount. On the other hand, the waveform indicated by a dashed double-dotted line "beta" in FIG. 4 is a heat production rate waveform in the case where the fuel injection pressure has been set lower than the appropriate value, and as shown by this waveform, the combustion speed is low and the timing at which the peak appears is shifted a large amount toward the angle of delay side, and so there is concern that it will be impossible to ensure sufficient engine throttle.

As described above, the technique for setting the target fuel pressure according to the present embodiment is based on the technical idea that combustion efficiency is improved by optimizing the changing state of the heat production rate (optimizing the heat production rate waveform).

Note that in the actual fuel injection operation, the above-described pilot injection and pre-injection are executed prior to the main injection having this kind of heat production rate waveform. As a result of the pilot injection and pre-injection, the temperature in the cylinder is raised sufficiently, and favorable ignition of fuel injected in the main injection is ensured, and as a result of the pre-injection, the initial combustion speed from main injection is suppressed, thereby leading to stable diffusion combustion.

—Injection Form of Pre-Injection and Main Injection—

The following is a specific description of an injection form of the pre-injection and main injection described above, which is a characteristic feature of the present embodiment.

In the injection form of pre-injection and main injection in the present embodiment, the injection timings and injection amounts of pre-injection and main injection are controlled so that the timing at which the rate of heat production due to the combustion of fuel injected in pre-injection is maximal, the combustion start timing of fuel injected in main injection, and the timing at which the piston 13 moving back and forth in the cylinder reaches compression top dead center are substantially the same (operation for controlling fuel injection timings and injection amounts by the fuel injection control means). In other words, the timing at which the rate of heat production due to the combustion of fuel injected in pre-injection is maximal and the combustion start timing of fuel injected in main injection are made substantially the same, and furthermore this timing is made substantially the same as the timing at which the piston 13 reaches compression top dead center. This fuel injection control in the injection form for pre-injection and main injection is referred to below as a high-efficiency fuel injection control operation.

Figure 5:
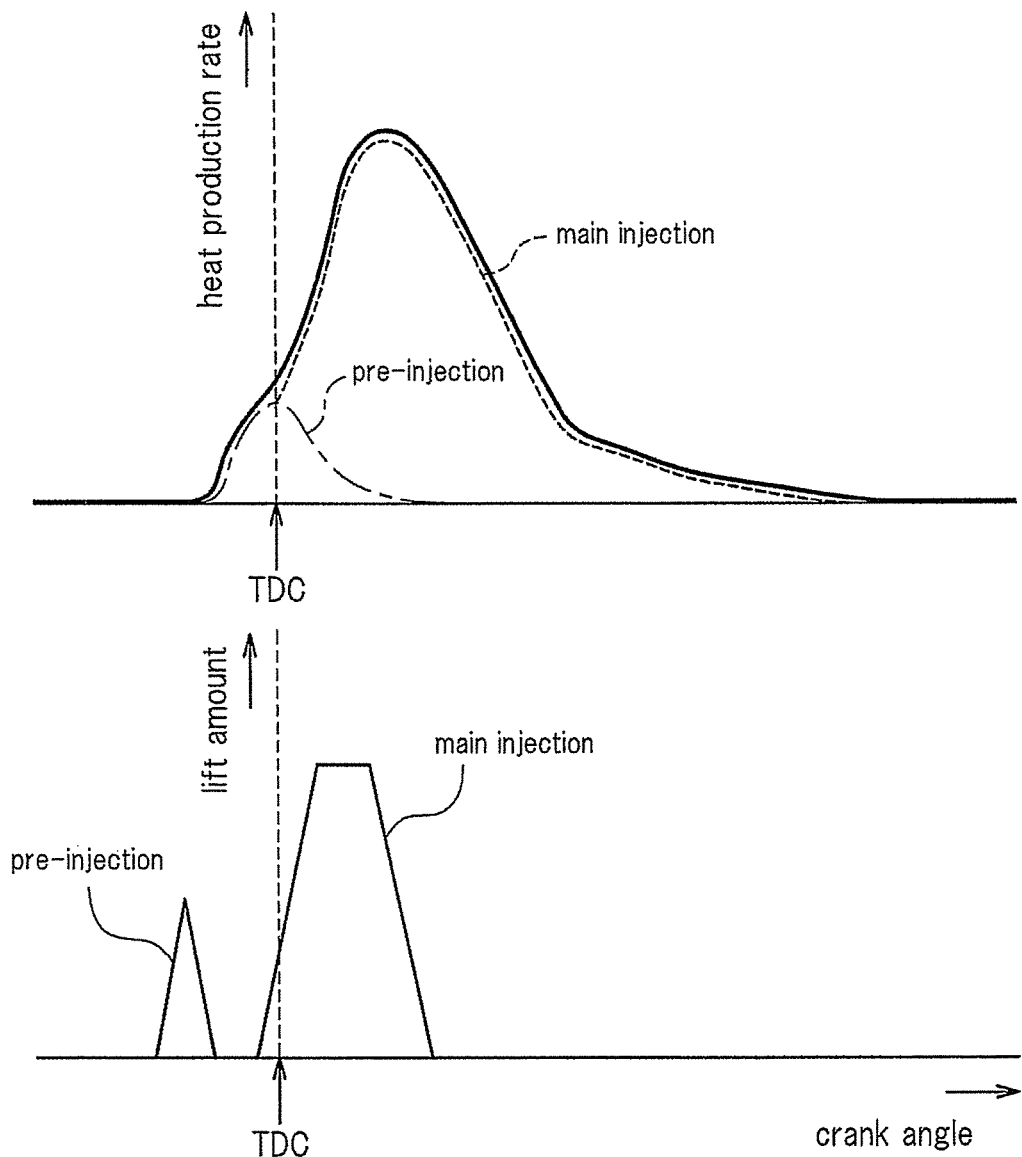
FIG. 5 is a diagram showing a fuel injection pattern and a heat production amount in a cylinder during execution of a high-efficiency fuel injection control operation according to the embodiment of the present invention.

FIG. 5 shows heat production rate waveforms and injection patterns of pre-injection and main injection during execution of the high-efficiency fuel injection control operation.

As shown in FIG. 5, pre-injection is executed on the angle of advance side of the point at which the piston 13 reaches compression top dead center (TDC) (the pre-injection start timing and end timing are set to be on the angle of advance side of the point at which the piston 13 reaches compression top dead center), and the timing at which the rate of heat production due to the combustion of fuel injected in this pre-injection is maximal is set to the timing at which the piston 13 reaches compression top dead center (in the figure, see the change waveform of the rate of heat production due to the combustion of fuel injected in pre-injection, which is indicated by a dashed-dotted line).

Also, main injection is started slightly on the angle of advance side of the point at which the piston 13 reaches compression top dead center, the main injection is ended on the angle of delay side of the point at which the piston 13 reaches compression top dead center, and the start timing of the combustion of fuel injected in this main injection is set to the timing at which the piston 13 reaches compression top dead center (in the figure, see change waveform of rate of heat production due to the combustion of fuel injected in main injection, which is shown by a dashed line).

As a result, as is understood from the heat production rate waveform indicated by the solid line in FIG. 5, the rate of heat production due to the combustion of fuel injected in the pre-injection and the rate of heat production due to the combustion of fuel injected in the main injection form a continuous waveform (waveform that forms an envelope).

In the case of executing pre-injection according to these timings, the fuel that is injected in this pre-injection and that flows along a swirl flow in the cylinder does not overlap with fuel injected in the subsequent main injection.

Specifically, the flow of air flowing into the cylinder from the intake port 15*a* in the suction stroke of the engine 1 is a swirl flow in which the center of rotation is the above-described cylinder center line P, and this swirl flow occurs continuously in the cylinder in the compression stroke.

For this reason, the fuel injected in pre-injection flows in the circumferential direction in the cylinder due to this swirl flow. In other words, as time elapses in the compression stroke, fuel (a cloud of spray) injected in the pre-injection flows from a position facing an injection hole of the injector 23 (a position immediately after injection), in a circumferential direction along the swirl flow.

Accordingly, at a point of executing the main injection that follows the pre-injection, the fuel injected in the previously executed pre-injection is already flowing in the circumferential direction in the cylinder, and the clouds of fuel injected from the same injection hole in the two instances of injection (pre-injection and main injection) do not overlap each other (i.e., the clouds of fuel from the injections do not coalesce).

In this case, the fuel from the pre-injection that was injected from the injection hole on the upstream side in the swirl flow direction flows toward a position opposing an injection hole on the downstream side in the swirl flow direction, and therefore by adjusting the injection timing of the subsequent main injection, that is to say, by adjusting the interval between the pre-injection and main injection, it is possible to prevent the fuel injected in the pre-injection and the fuel injected in the main injection from coalescing.

More specifically, consider the case in which the swirl flow rotates one time in the circumferential direction in the cylinder from when the piston 13 is at bottom dead center until when the piston 13 reaches top dead center (until 180 degrees of movement in terms of the crank angle). In other words, this is a case in which the swirl ratio is "2". Also, consider that in this case, the injector 23 is provided with "10" injection holes.

In this case, if the interval between pre-injection and main injection is set to be less than 36 degrees in the circumferential direction in the cylinder (18 degrees in terms of the crank angle), it is possible to prevent the fuel injected in pre-injection and the fuel injected in main injection from overlapping.

By preventing the fuel injected in pre-injection and the fuel injected in main injection from overlapping in this way, it is possible to cause the majority of the fuel injected in the pre-injection to contribute to preheating in the cylinder (i.e., to cause the pre-injection to be a preheating item). This enables starting the combustion of fuel injected in the main injection by fully utilizing the amount of heat produced by the combustion of fuel injected in the pre-injection.

The following is a more specific description of fuel injection timings.

Figure 6:
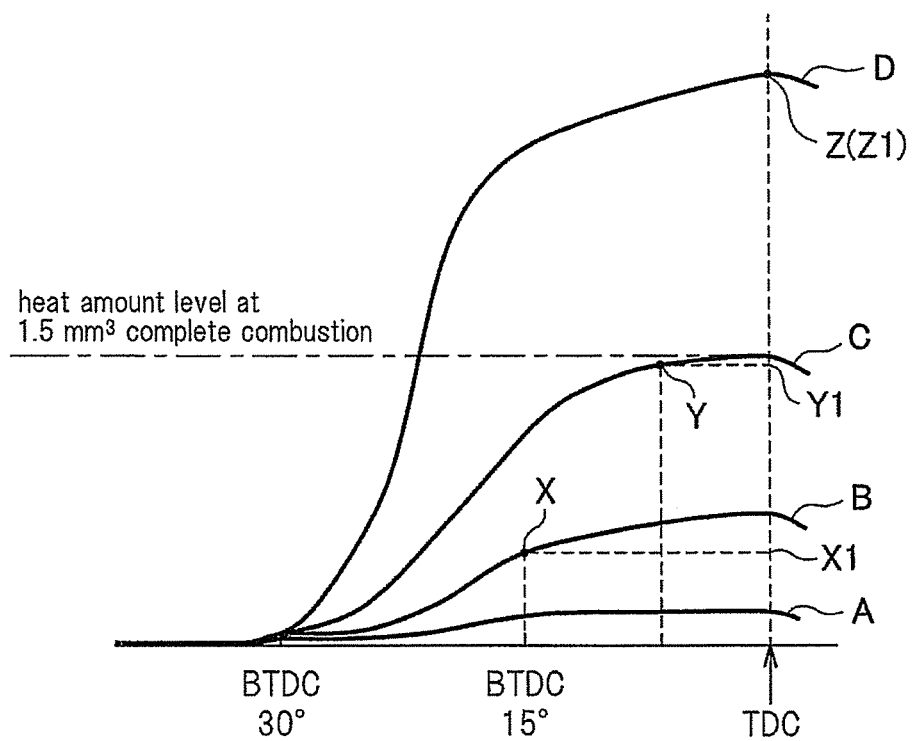
FIG. 6 is a diagram showing results of analyzing a relationship between pre-injection execution timing and the amount of heat produced in a cylinder at the execution timing with respect to a plurality of fuel injection amounts, according to the embodiment of the present invention.

FIG. 6 shows results of analyzing the relationship between pre-injection execution timing and the amount of heat produced in the cylinder at the pre-injection execution timing, with respect to a plurality of fuel injection amounts (A to D). For example, A is a fuel injection amount of 0.7 $mm^3$, B is a fuel injection of 1.5 $mm^3$, C is a fuel injection amount of 3.0 $mm^3$, and D is a fuel injection amount of 6.0 $mm^3$. The dashed-dotted line in FIG. 6 shows the heat amount level in the case of complete combustion of a fuel amount of 1.5 $mm^3$. For example, in FIG. 6, a point X indicates that the heat production amount is X1 [J] when pre-injection is executed at a timing when the piston 13 is 15 degrees before compression top dead center (BTDC), and the fuel injection amount is 1.5 $mm^3$. Also, a point Y in FIG. 6 indicates that the heat production amount is Y1 [J] when pre-injection is executed at a timing when the piston 13 is 7 degrees before compression top dead center (BTDC), and the fuel injection amount is 3.0 $mm^3$. Furthermore, a point Z in FIG. 6 indicates that the heat production amount is Z1 [J] when pre-injection is executed at a timing when the piston 13 is at compression top dead center (TDC), and the fuel injection amount is 6.0 $mm^3$.

As is understood from this figure, the closer the pre-injection injection timing approaches compression top dead center (TDC) of the piston 13, the greater the heat production amount even when the fuel injection amount is the same. This is because as the pre-injection injection timing advances away from compression top dead center (TDC) of the piston 13, a very small amount of fuel is injected in pre-injection while the interior volume of the combustion chamber is large (while the piston 13 is at a low position), and thereafter, even when the piston 13 reaches the vicinity of compression top dead center and the temperature in the cylinder rises (the rise in temperature is due to the compression of intake air), ignition is not possible since the fuel has already dispersed in a wide range in the combustion chamber 3, and the air-fuel mixture has become diluted. In particular, dilution of the air-fuel mixture progresses rapidly if pre-injection is executed at a timing that is on the angle of advance side of 18 degrees before compression top dead center (BTDC) of the piston 13, and ignition becomes impossible regardless of the fuel injection amount if pre-injection is executed at a timing that is on the angle of advance side of 30 degrees before compression top dead center (BTDC) of the piston 13.

Accordingly, if pre-injection is executed in an environment in which the piston 13 has reached the vicinity of compression top dead center and the temperature in the cylinder has risen, an air-fuel mixture that locally has a high concentration is exposed to a high-temperature environment and combustion starts, and therefore the closer the pre-injection injection timing approaches compression top dead center (TDC) of the piston 13, the greater the heat production amount even when the fuel injection amount is the same.

However, even if pre-injection is executed in the vicinity of compression top dead center (TDC) of the piston 13, approximately only 50% of the amount of fuel injected can actually contribute to the heat production amount. For example, in the case of pre-injection in which 3.0 $mm^3$ of fuel is injected at the timing of compression top dead center (TDC) of the piston 13, the heat production amount corresponds to a heat amount level in the case where 1.5 $mm^3$ of fuel has completely combusted (see FIG. 6).

For this reason, in order to increase the heat production amount in pre-injection, although it is possible to increase the amount of fuel injection in the pre-injection, this raises the concern of lowering fuel efficiency and producing reverse torque.

In view of this, in the present embodiment, the fuel injection timing of pre-injection is set so that the timing at which the heat production rate due to the combustion of fuel injected in this pre-injection is maximal is substantially the same as the timing at which the piston 13 reaches compression top dead center, as a result of which, a necessary and sufficient amount of heat is produced by fully utilizing fuel injected in pre-injection, and furthermore almost no reverse torque is produced by this pre-injection. In other words, this enables starting the combustion of fuel injected in main injection by fully utilizing the heat production amount due to the combustion of fuel injected in pre-injection. For example, the fuel injection timing of pre-injection is set to a timing that is 7 degrees before compression top dead center (BTDC) of the piston 13, and as a result, the timing at which the heat production rate due to the combustion of fuel injected in pre-injection is maximal is substantially the same as the timing at which the piston 13 reaches compression top dead center.

In order for pre-injection to be executed at this timing, engine revolution, accelerator opening degree (engine load), coolant temperature, and the like are set as parameters through experimentation etc. in advance, a map is created of pre-injection execution timings at which the timing of a maximum heat production rate due to the combustion of fuel injected in pre-injection is substantially the same as the timing at which the piston 13 reaches compression top dead center, and this map is stored in the ROM 102 described above. Then, in the case of executing pre-injection, this map is referenced, an execution timing indicated therein is set, and pre-injection is executed. As a result, the timing at which the heat production rate due to the combustion of fuel injected in this pre-injection is maximal is substantially the same as the timing at which the piston 13 reaches compression top dead center. Note that the map is obtained so that the pre-injection execution timing is adjusted more toward the angle of advance side as the engine revolution increases, as the accelerator opening degree increases, and furthermore as the coolant temperature decreases. The relationship between the parameters and the pre-injection execution timings obtained by this map is not limited to this.

Likewise, engine revolution, accelerator opening degree (engine load), coolant temperature, fuel injection amount in pre-injection, and the like are set as parameters through experimentation etc. in advance, a map is created of main injection execution timings at which the start timing of the combustion of fuel injected in main injection is substantially the same as the timing at which the piston 13 reaches compression top dead center, and this map is stored in the ROM 102 described above. Then, in the case of executing main injection, this map is referenced, an execution timing indicated therein is set, and main injection is executed. As a result, the start timing of the combustion of fuel injected in main injection is substantially the same as the timing at which the piston 13 reaches compression top dead center. Note that the map is obtained so that the main injection execution timing is adjusted more toward the angle of advance side as the engine revolution increases, as the accelerator opening degree increases, as the coolant temperature decreases, and furthermore as the fuel injection amount in pre-injection decreases. The relationship between the parameters and the main injection execution timings obtained by this map is not limited to this.

Figure 7:
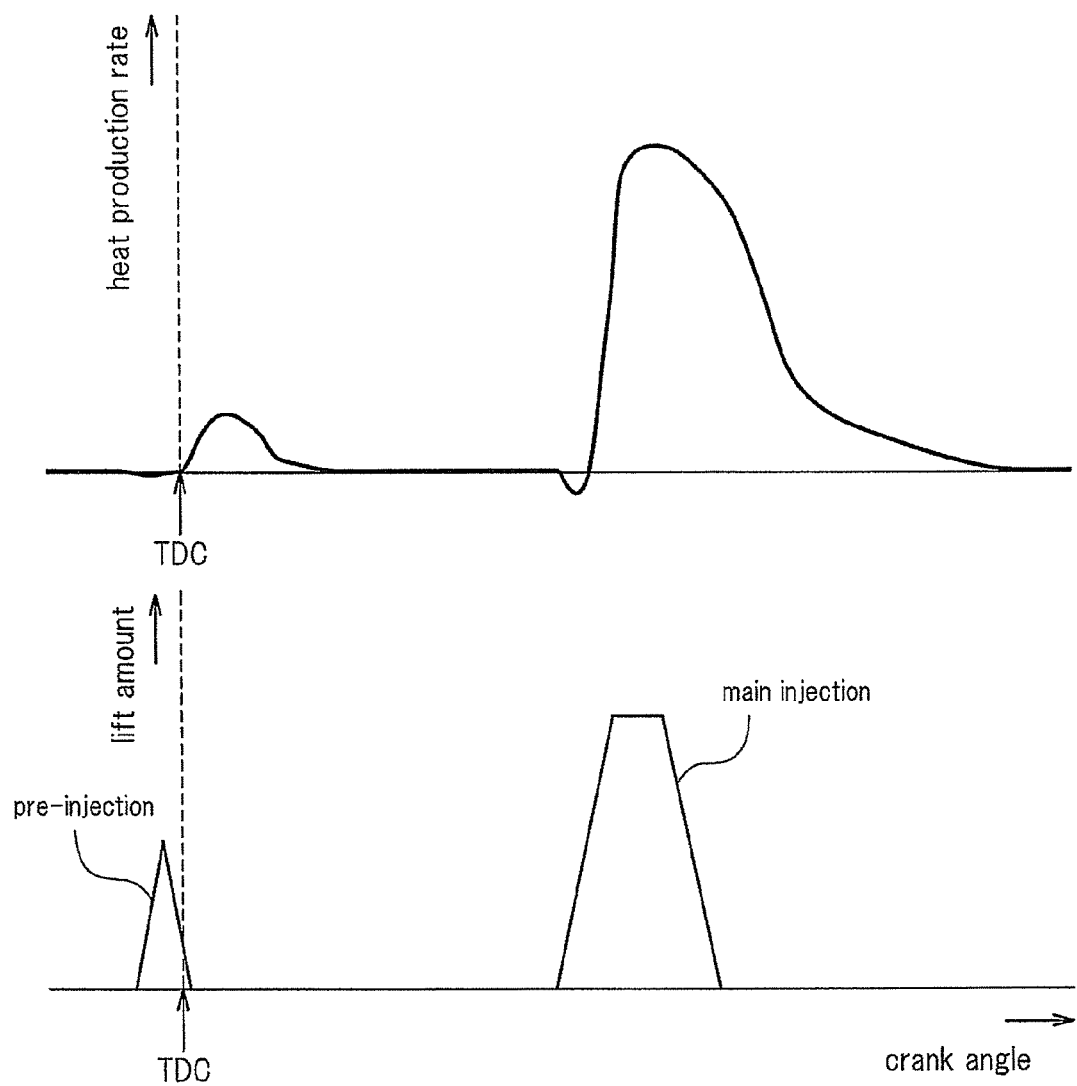
FIG. 7 is a diagram showing a fuel injection pattern and a heat production amount in a cylinder during execution of an exhaust-emission-priority fuel injection control operation according to the embodiment of the present invention.

Besides the high-efficiency fuel injection control operation described above, another injection form of pre-injection and main injection in the present embodiment is a form in which the start timing of the combustion of fuel injected in main injection is set to a timing that is later than (on the angle of delay side) the timing at which the rate of heat production due to the combustion of fuel injected in pre-injection is maximal. This fuel injection control in the injection form for pre-injection and main injection is referred to below as an exhaust-emission-priority fuel injection control operation. FIG. 7 shows an example of a heat production rate waveform and fuel injection patterns of pre-injection and main injection during execution of this exhaust-emission-priority fuel injection control operation.

A comparison of FIG. 5 (heat production rate waveform in the high-efficiency fuel injection control operation) and FIG. 7 (heat production rate waveform in the exhaust-emission-priority fuel injection control operation) shows that as described above, the heat production rate waveform of pre-injection and the heat production rate waveform of main injection in the high-efficiency fuel injection control operation form an envelope (envelope combustion scheme). In contrast, the heat production rate waveform of pre-injection and the heat production rate waveform of main injection in the exhaust-emission-priority fuel injection control operation each form an independent waveform (independent combustion scheme).

In the present embodiment, the case of executing pre-injection and main injection according to the injection pattern for executing the high-efficiency fuel injection control operation described above, and the case of executing pre-injection and main injection according to the injection pattern for executing the exhaust-emission-priority fuel injection control operation described above are switched according to the operating state of the engine 1.

For example, in an operating range of the engine 1 in which exhaust emission is not exacerbated (e.g., in a low load or intermediate load operating range), the high-efficiency fuel injection control operation is performed in which the timing at which the rate of heat production due to the combustion of fuel injected in the pre-injection is maximal, the start timing of the combustion of fuel injected in main injection, and the timing at which the piston 13 reaches compression top dead center are set so as to be substantially the same. On the other hand, in an operating range of the engine 1 (e.g., a high load operating range) in which there is concern regarding the exacerbation of exhaust emission (e.g., an increase in NOx production amount), or in a situation in which exhaust emission has actually exacerbated, the exhaust-emission-priority fuel injection control operation is performed in which the start timing of the combustion of fuel injected in the main injection is set to be later than the timing at which the rate of heat production due to the combustion of fuel injected in the pre-injection is maximal (set to a timing after the piston 13 has reached compression top dead center). As shown in FIG. 7, the NOx production amount is suppressed by lowering the combustion temperature as a result of moving the fuel injection timings toward the angle of delay side (more toward the angle of delay side than the case of performing the high-efficiency fuel injection control operation).

In this way, switching the high-efficiency fuel injection control operation and exhaust-emission-priority fuel injection control operation according to the operating state of the engine 1 enables both preventing the exacerbation of exhaust emissions and realizing high fuel efficiency.

As described above, in the present embodiment, it is possible to set the injection form for pre-injection and main injection in a control process series, and the construction of a novel control rule enables fixing parameters in injection and realizing integrated control that uniquely determines the injection patterns of pre-injection and main injection. Also, executing pre-injection and main injection according to this control process enables obtaining a highly efficient combustion form while improving the fuel consumption rate.

Note that although the injecting timings of pre-injection and main injection in the exhaust-emission-priority fuel injection control operation described above are both set to be more toward the angle of delay side than the injection timings of pre-injection and main injection in the high-efficiency fuel injection control operation described above, it is possible to set only the injection timing of main injection more toward the angle of delay side. In other words, the injection timing of pre-injection in the exhaust-emission-priority fuel injection control operation is set to be the same as the injection timing of pre-injection in the high-efficiency fuel injection control operation, and the timing at which the rate of heat production due to the combustion of fuel injected in pre-injection is maximal is set to be substantially the same as the timing when the piston 13 reaches compression top dead center.

As the above-described technological idea for setting the injection timing of pre-injection, if there is a desire to obtain a sufficient preheating effect by pre-injection (e.g., when the internal combustion engine is cold) when the exhaust-emission-priority fuel injection control operation is performed, the timing at which the rate of heat production due to the combustion of fuel injected in the pre-injection is maximal is caused to be substantially the same as the timing at which the piston 13 reaches compression top dead center. On the other hand, if there is a desire to reliably avoid the production of the above-described reverse torque, the timing at which the rate of heat production due to the combustion of fuel injected in the pre-injection is maximal is set to be later than the timing at which the piston 13 reaches compression top dead center. Note that as the injection timing of pre-injection in this case, rather than being limited to switching two timings (setting the timing of the maximum rate of heat production in pre-injection to TDC or ATDC), it is possible to switch a plurality of levels according to the required preheating amount or the like.

Modifications

The following describes a modification. The above embodiment describes a case in which the pre-injection performed prior to main injection is executed only one time (see FIG. 5). In the present modification, this pre-injection is executed two times. One example is a fuel injection pattern executed in the case where a large preheating amount is required in the cylinder. The other configurations and fuel injection operations are the same as in the embodiment described above, and therefore the following describes only differences from the embodiment described above.

Figure 8:
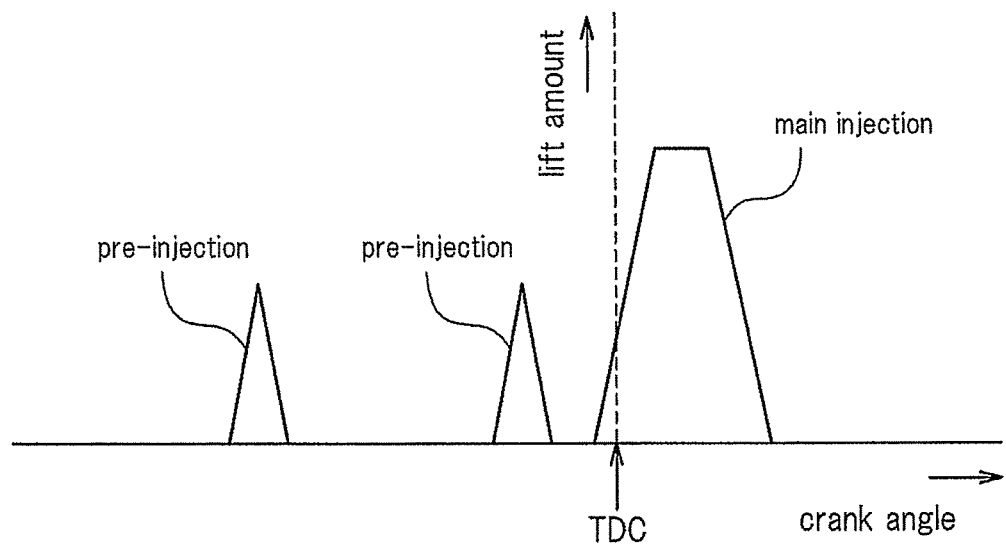
FIG. 8 is a diagram showing a fuel injection pattern during execution of a high-efficiency fuel injection control operation in a modification of the present invention.

FIG. 8 shows injection patterns of pre-injection and main injection when executing the high-efficiency fuel injection control operation in the present modification.

In the fuel injection pattern shown in FIG. 8, a second instance of pre-injection (pre-injection executed immediately before main injection) is executed in the same way as the pre-injection in the embodiment described above. In other words, the timing at which the heat production rate due to the combustion of fuel injected in this second instance of pre-injection is maximal is substantially the same as the timing at which the piston 13 reaches compression top dead center.

Other Embodiments

The above embodiment and modification describe examples in which the present invention is applied to an inline-4 cylinder diesel engine mounted in an automobile. However, rather than being limited to use in an automobile, the present invention can be applied to an engine used for another purpose. There are also no particular limitations on the number of cylinders or engine format (inline engine, V engine, or the like).

Also, although the maniverter 77 includes the NSR catalyst 75 and DPNR catalyst 76 in the above embodiment, the maniverter 77 may include the NSR catalyst 75 and a DPF (Diesel Particulate Filter).

Furthermore, in the above embodiment and modification, the high-efficiency fuel injection control operation and exhaust-emission-priority fuel injection control operation are switched according to the operating state of the engine 1. Rather than being limited to this, the technological idea of the present invention also includes the case of executing only the high-efficiency fuel injection control operation.

Note that some symbol characters are described as alphabetical characters as shown below in this specification. Individual alphabetical characters "alpha", "beta", "delta", "eta", and "multiply" correspond to respective symbol characters. "$\alpha$", "$\beta$", "$\Delta$", "$\eta$", and "$\cdot$".

The present invention can be executed in various other forms without departing from the spirit or major characteristics the present invention. The embodiment and modification described above are therefore nothing more than examples in every respect, and should not be interpreted in a limiting way. The scope of the present invention is defined in the claims, and should not be restricted to the body of the specification in any way. Furthermore, the present invention encompasses all variations and modifications existing within a scope equivalent to the claims.

INDUSTRIAL APPLICABILITY

A fuel injection control apparatus of an internal combustion engine of the present invention is advantageous in providing, for a compression self-igniting internal combustion engine in which auxiliary injection can be performed prior to main injection, a systematized fuel injection control technique that can optimize the injection form of the main injection and auxiliary injection.

As described above, although the present invention is applicable to an inline-4 cylinder diesel engine mounted in an automobile, the present invention is not limited to automobile use. The present invention can also be applied to engines used for other purposes. Also, in addition to a case of switching the high-efficiency fuel injection control operation and exhaust-emission-priority fuel injection control operation according to the operating state of the engine, the present invention can be used in a case of executing only the high-efficiency fuel injection control operation.

REFERENCE SIGNS LIST

1 Engine (internal combustion engine)
12 Cylinder bore
13 Piston
23 Injector (fuel injection valve)

The invention claimed is:

1. A fuel injection control apparatus of a compression self-igniting internal combustion engine in which at least a main injection and an auxiliary injection performed prior to the main injection can be performed as an operation of fuel injection from a fuel injection valve, the fuel injection control apparatus comprising:

a fuel injection control device that executes a high-efficiency fuel injection control operation for controlling an injection timing and an injection amount of the main injection and the auxiliary injection so that a timing at which a rate of heat production due to combustion of fuel injected in the auxiliary injection is maximal, a start timing of combustion of fuel injected in the main injection, and a timing at which a piston moving back and forth in a cylinder reaches compression top dead center are substantially the same.

2. The fuel injection control apparatus of claim 1, wherein the fuel injection control device executes an exhaust-emission-priority fuel injection control operation for setting the start timing of combustion of fuel injected in the main injection so as to be later than the timing at which the rate of heat production due to combustion of fuel injected in the auxiliary injection is maximal, and the fuel injection control device switches the high-efficiency fuel injection control operation and the exhaust-emission-priority fuel injection control operation according to an operating state of the internal combustion engine.

3. The fuel injection control apparatus of claim 2, wherein in a case of executing the exhaust-emission-priority fuel injection control operation, the fuel injection control device switches, according to the operating state of the internal combustion engine, a case of setting the timing at which the rate of heat production due to combustion of fuel injected in the auxiliary injection is maximal so as to be substantially the same as the timing at which the piston reaches compression top dead center, and a case of setting the timing at which the rate of heat production due to combustion of fuel injected in the auxiliary injection is maximal so as to be later than the timing at which the piston reaches compression top dead center.

* * * * *